(12) United States Patent
Sundaramoorthy et al.

(10) Patent No.: US 10,679,220 B2
(45) Date of Patent: Jun. 9, 2020

(54) USING SMART DATA TO ENABLE PROFILE-BASED TRANSACTIONS

(71) Applicant: Bank of America Corporation, Charlotte, NC (US)

(72) Inventors: Crystal M. Sundaramoorthy, Charlotte, NC (US); Dimitra J. Tsagris, Antioch, CA (US); Manu Kurian, Dallas, TX (US)

(73) Assignee: Bank of America Corporation, Charlotte, NC (US)

( * ) Notice: Subject to any disclaimer, the term of this patent is extended or adjusted under 35 U.S.C. 154(b) by 196 days.

(21) Appl. No.: 15/824,024

(22) Filed: Nov. 28, 2017

(65) Prior Publication Data

US 2019/0164168 A1    May 30, 2019

(51) Int. Cl.

| | | |
|---|---|---|
| *G06F 15/16* | (2006.01) | |
| *G06Q 20/42* | (2012.01) | |
| *H04L 29/08* | (2006.01) | |
| *G06Q 50/00* | (2012.01) | |
| *G06Q 20/12* | (2012.01) | |
| *G06Q 20/08* | (2012.01) | |
| *G06Q 30/06* | (2012.01) | |
| *H04L 29/06* | (2006.01) | |

(52) U.S. Cl.
CPC ......... *G06Q 20/42* (2013.01); *G06Q 20/0855* (2013.01); *G06Q 20/12* (2013.01); *G06Q 30/0613* (2013.01); *G06Q 30/0617* (2013.01); *G06Q 50/01* (2013.01); *H04L 63/102* (2013.01); *H04L 67/141* (2013.01); *H04L 67/18* (2013.01); *H04L 67/20* (2013.01); *H04L 67/306* (2013.01)

(58) Field of Classification Search
CPC ....... H04L 67/141; H04L 67/18; H04L 67/20; H04L 67/306; G06Q 30/0613; G06Q 30/0617; G06Q 30/06; G06Q 30/0639; G06Q 20/3224; G06Q 20/12; G06Q 20/42; G06Q 50/01; G06Q 20/0855
USPC .... 709/203, 206, 217, 224; 705/26.1, 26.41, 705/26.43, 44; 455/456.1
See application file for complete search history.

(56) References Cited

U.S. PATENT DOCUMENTS

| | | |
|---|---|---|
| 5,862,223 A | 1/1999 | Walker et al. |
| 7,324,966 B2 | 1/2008 | Scheer |
| 7,437,703 B2 | 10/2008 | Wu |
| 7,958,067 B2 | 6/2011 | Schmidtler et al. |
| 8,239,229 B1 | 8/2012 | Paiz |
| 8,260,266 B1 * | 9/2012 | Amidon ............ H04M 3/42348 455/414.1 |
| 8,315,900 B2 | 11/2012 | Schwarz et al. |
| 8,355,963 B2 | 1/2013 | Sicard |

(Continued)

*Primary Examiner* — Liang Che A Wang
*Assistant Examiner* — Johnny B Aguiar
(74) *Attorney, Agent, or Firm* — Banner & Witcoff, Ltd.; Michael A. Springs

(57) ABSTRACT

Aspects of the disclosure relate to implementing and using a data processing system to generate a plurality of user profiles including linked user accounts. An instruction for a transaction may be received from a first user computing device, and a request to complete the transaction on behalf of the first user may be transmitted to a second user computing device. Upon receiving appropriate authorizations, the computing platform may transmit to a participant an instruction to complete the transaction with the second user on behalf of the first user.

20 Claims, 6 Drawing Sheets

(56) References Cited

U.S. PATENT DOCUMENTS

| | | |
|---|---|---|
| 8,386,325 B2 | 2/2013 | Bock et al. |
| 8,401,908 B2 | 3/2013 | Bildmayer et al. |
| 8,738,476 B2 | 5/2014 | Wocher et al. |
| 8,818,884 B2 | 8/2014 | Marschall et al. |
| 9,396,388 B2 | 7/2016 | Amtrup et al. |
| 2009/0319427 A1 | 12/2009 | Gardner et al. |
| 2012/0066121 A1 | 3/2012 | Shahbazi et al. |
| 2013/0006816 A1* | 1/2013 | Nuzzi ................ G06Q 30/0261 705/27.1 |
| 2013/0262253 A1* | 10/2013 | Shih ..................... G06Q 30/06 705/26.1 |
| 2013/0325663 A1* | 12/2013 | Scipioni ................ G06Q 50/01 705/26.43 |
| 2013/0346245 A1* | 12/2013 | Desore .................. G06Q 20/10 705/26.41 |
| 2014/0040043 A1* | 2/2014 | Barron .................. G06Q 10/00 705/14.66 |
| 2014/0258010 A1* | 9/2014 | Mardikar ............. G06Q 20/202 705/21 |
| 2015/0242764 A1* | 8/2015 | Subbaraj ............... G06Q 10/02 705/5 |

\* cited by examiner

USING SMART DATA TO ENABLE PROFILE-BASED TRANSACTIONS

BACKGROUND

Aspects of the disclosure relate to electrical computers, data processing systems, and machine learning. In particular, one or more aspects of the disclosure relate to implementing and using a platform that defines and networks a plurality of user profiles and enables transactions to be completed by other users within a network on behalf of an authorizing user.

SUMMARY

Aspects of the disclosure provide effective, efficient, scalable, and convenient technical solutions that address and overcome the technical problems associated with optimizing, maintaining, and utilizing computer systems and services. In particular, one or more aspects of the disclosure provide techniques for generating a plurality of user profiles and enabling users to complete transactions on behalf of other users within a defined network, such as a segmented network.

In accordance with one or more embodiments, a computing platform having at least one processor, a memory, and a communication interface may receive, via the communication interface, user information for a plurality of users. The computing platform may generate a corresponding plurality of user profiles each including one or more linked user accounts. The computing platform may establish, via the communication interface, a first connection with a first user computing device and, while the first connection is established, receive from the first user computing device an instruction for a transaction. The computing platform may establish, via the communication interface, a second connection with a second user computing device and, while the second connection is established, transmit to the second user computing device a request to complete the transaction on behalf of the first user. The request, when executed by the second user computing device, causes a notification to be displayed on the second user computing device. The computing platform may establish, via the communication interface, a third connection with a first participant computing platform and, while the third connection is established, transmit to the first participant computing platform an instruction to complete the transaction with the second user on behalf of the first user.

In some aspects, the computing platform may establish, via the communication interface, a fourth connection with a plurality of user computing devices and, while the fourth connection is established, receive user preference information from the plurality of user computing devices. The user preference information may be used to generate the corresponding plurality of user profiles.

In some aspects, the computing platform may establish, via the communication interface, a fourth connection with an administrative computing device and, while the fourth connection is established, receive from the administrative computing device linked user account information for the plurality of users. The linked user account information may be used to generate the plurality of user profiles.

In some aspects, the computing platform may establish, via the communication interface, a fourth connection with a social media computing platform and, while the fourth connection is established, receive from the social media computing platform social media information for the plurality of users. The social media information may be used to generate the plurality of user profiles.

In other aspects, the computing platform may receive, via the communication interface, geolocation information for the second user computing device. The request to complete the transaction on behalf of the first user may be generated based on a geolocation of the second user computing device.

In other aspects, the computing platform may transmit, via the communication interface, to the first user computing device, a request to authorize a transaction. When executed by the first user computing device, the request may cause a notification to be displayed on the first user computing device. The computing platform may transmit to the first participant computing platform an instruction to complete the transaction upon receiving the authorization from the first user computing device.

In yet other aspects, the computing platform may establish, via the communication interface, a fourth connection with a machine learning engine. Based on a machine learning dataset received from the machine learning engine, the computing platform may modify one or more of the plurality of user profiles.

In still other aspects, while the third connection is established, the computing platform may receive, via the communication interface, from the first participant computing platform, itemized information allocating items within a transaction to a plurality of users. The computing platform may update the linked user accounts of the respective plurality of users while authorizing the transaction.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

There are many instances, whether for purposes of convenience, gratuity, or necessity, that individuals engage in transactions on behalf of other individuals. Depending on the nature of the transaction and the relationship of the individuals involved, such proxy transactions may present a number of logistical challenges and inefficiencies. For example, in an office environment, in order to minimize disruptions to productivity one worker may go out to purchase food items for himself or herself and several other coworkers. Such a process may involve taking a food order from the other coworkers, purchasing the requested items, and either collecting advance payment or later reimbursement from the coworkers for the items purchased on their behalf. Aspects of the disclosure relate to systems for developing user profiles that may include not only user preferences but also linked user accounts so that one user may complete a transaction on behalf of one or more other users within a network, e.g., upon their concurrent or prior authorization. Thus, in the above example in which a worker purchases food items for coworkers, the systems disclosed herein may avoid the need for the steps of obtaining a food order and receiving payment or reimbursement from the coworkers, since food preferences or selections may be included in the coworkers' respective profiles, and the purchases may be charged directly to the coworkers' respective linked user accounts.

Figure 1A:
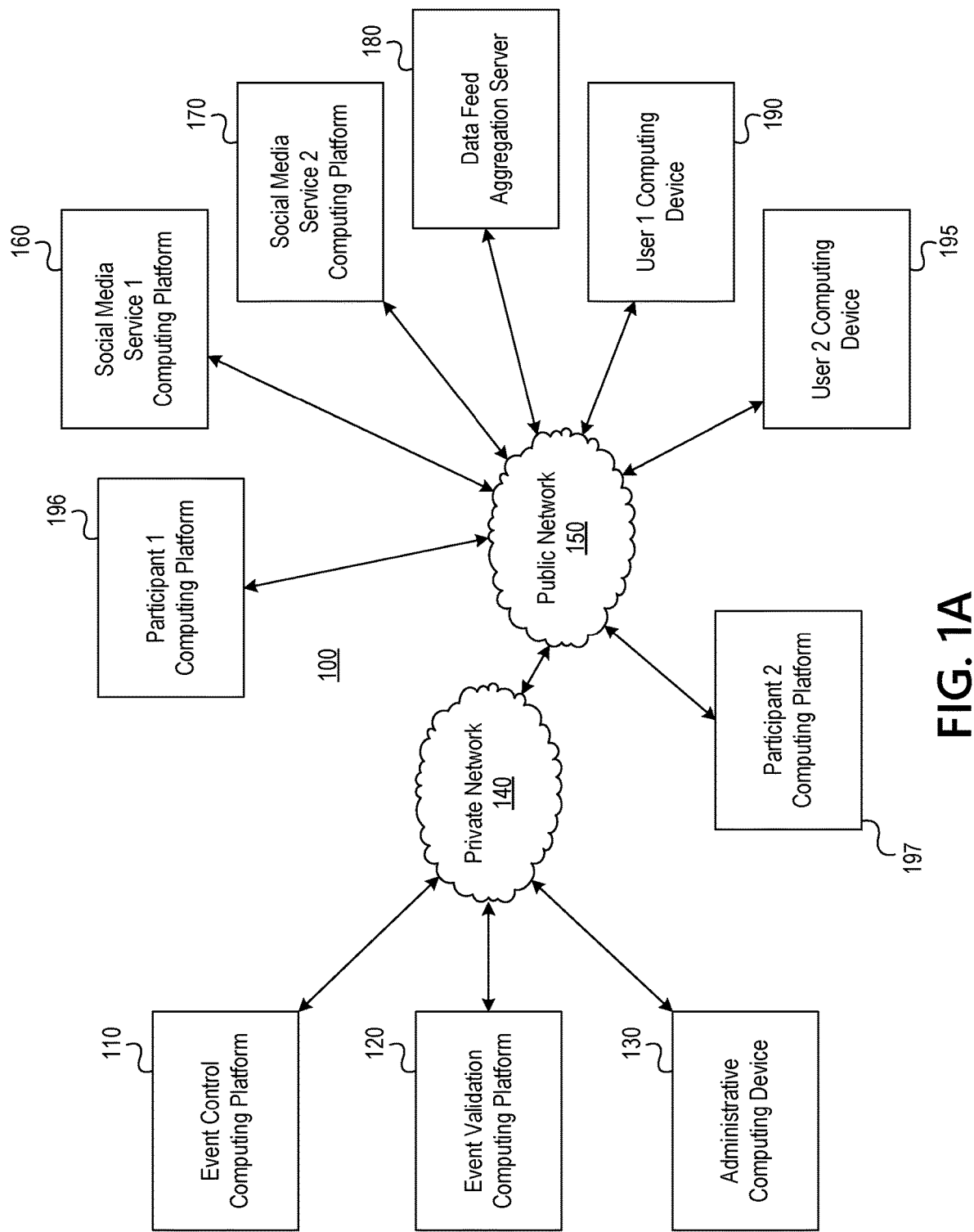
FIGS. 1A and 1B depict an illustrative computing environment for validating and controlling events executed across multiple computing platforms and devices in accordance with one or more example embodiments.
Figure 1B:
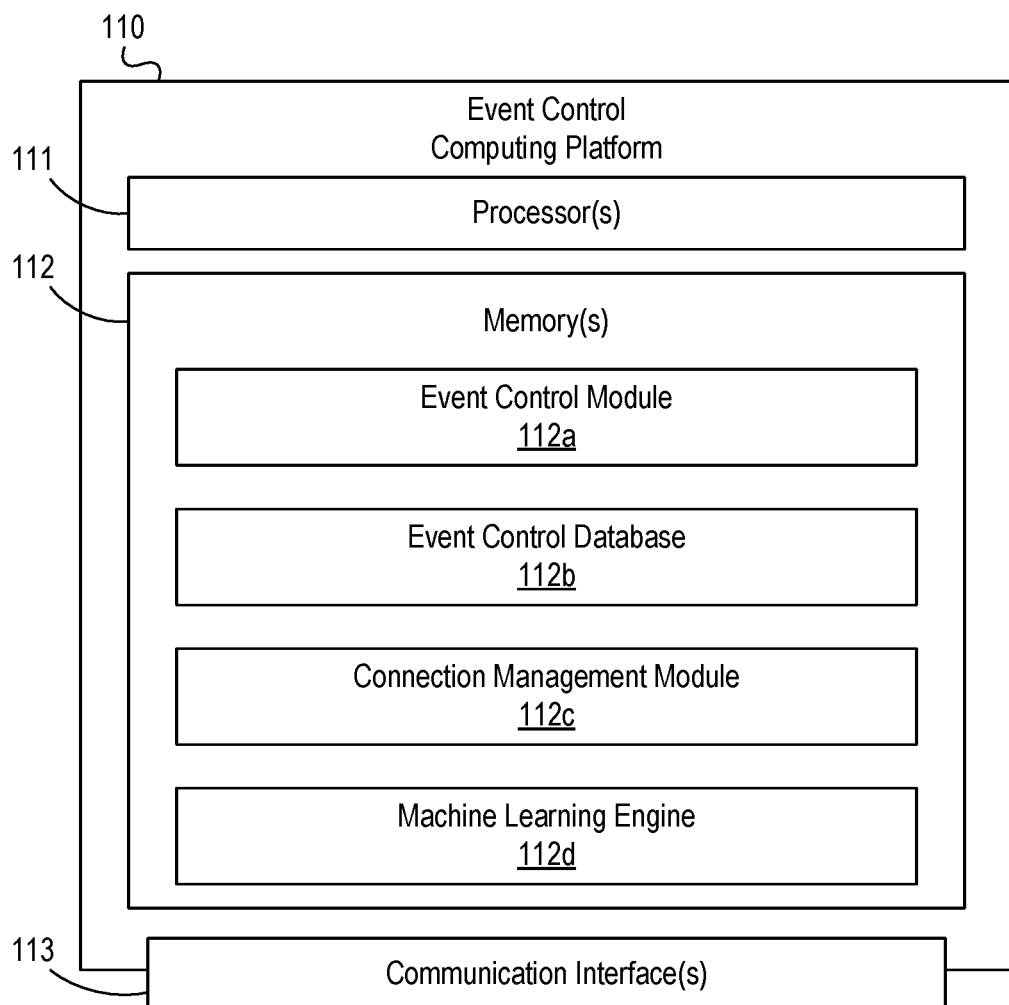

FIGS. 1A and 1B depict an illustrative computing environment for validating and controlling events executed across multiple computing platforms and devices in accordance with one or more example embodiments. Referring to FIG. 1A, computing environment 100 may include one or more computer systems, one or more computer networks, and/or other computing infrastructure. For example, computing environment 100 may include an event control computing platform 110, an event validation computing platform 120, an administrative computing device 130, a private network 140, a public network 150, a first social media service computing platform 160, a second social media service computing platform 170, a data feed aggregation server 180, a first user computing device 190, a second user computing device 195, a first participant computing platform 196, and a second participant computing platform 197.

As discussed in greater detail below, event control computing platform 110 may include one or more computing devices configured to perform one or more of the functions described herein. For example, event control computing platform 110 may include one or more computers (e.g., laptop computers, desktop computers, servers, server blades, or the like) that are configured to orchestrate event validation operations and event control operations across multiple computer systems and devices in computing environment 100.

Event validation computing platform 120 may include one or more computing devices configured to validate events based on event data received from event control computing platform 110 and/or from other sources. For example, event validation computing platform 120 may receive, from event control computing platform 110 and/or one or more other systems, event information defining one or more transactions to be executed in computing environment 100, and event validation computing platform 120 subsequently may authorize and/or otherwise validate the one or more transactions to be executed in computing environment 100, so as to allow the transactions to proceed and/or otherwise be executed. In some instances, the transactions may have been requested by one or more computing devices, such as the first user computing device 190 and/or second user computing device 195, and event validation computing platform 120 may evaluate and/or selectively authorize the requested transactions based on information stored and/or maintained by event validation computing platform 120 (e.g., such as financial account information, account balance information, transaction history information, and/or account rules) and/or based on information received from event control computing platform 110 (e.g., such as user-specific transaction rules, account-specific transaction rules, user-specific trends information, user-segment trends information, and/or other information) and/or one or more other systems. In some examples, enhanced security measures such as two-factor authentication may be used to reduce the possibility of fraudulent use of the system.

Administrative computing device 130 may be a desktop computer, laptop computer, workstation, or other computing device that is configured to be used by an administrative user, such as a network administrator associated with an organization operating event control computing platform 110 and/or event validation computing platform 120.

Social media service computing platform 160 may include one or more computing devices configured to host a first social media service (which may, e.g., be provided by an organization different from the organization operating event control computing platform 110 and/or event validation computing platform 120). In some instances, social media service computing platform 160 may maintain user profile information for various users of the first social media service, provide user interfaces associated with the first social media service to various user devices (e.g., first user computing device 190, second user computing device 195), and provide activity feed data to other systems and/or devices included in computing environment 100, such as event control computing platform 110, event validation computing platform 120, data feed aggregation server 180, and/or the like. For instance, social media service computing platform 160 may, in some arrangements, provide activity feed data (e.g., such as user-specific image data, user-specific geolocation data, user-specific likes data, and/or other user-specific data) to event control computing platform 110 to enable one or more functions provided by event control computing platform 110 (e.g., such as social-media-enabled financial-transaction functions).

Social media service computing platform 170 may include one or more computing devices configured to host a second social media service (which may, e.g., be provided by an organization different from the organization operating event control computing platform 110 and/or event validation computing platform 120). Additionally, the second social media service may be different from the first social media service (e.g., the second social media service may be provided by an organization different from the organization providing the first social media service). In some instances, social media service computing platform 170 may maintain user profile information for various users of the second social media service, provide user interfaces associated with the second social media service to various user devices (e.g., first user computing device 190 and/or second user computing device 195), and provide activity feed data to other systems and/or devices included in computing environment 100, such as event control computing platform 110, event validation computing platform 120, data feed aggregation server 180, and/or the like. For instance, social media service computing platform 170 may, in some arrangements, provide activity feed data (e.g., such as user-specific image data, user-specific geolocation data, user-specific likes data, and/or other user-specific data) to event control computing platform 110 to enable one or more functions provided by event control computing platform 110 (e.g., such as social-media-enabled financial-transaction functions).

Data feed aggregation server 180 may include one or more computing devices configured to aggregate data feeds from various source systems (e.g., social media service computing platform 160, social media service computing platform 170, and/or other sources) and/or communicate data feeds to various destination systems (e.g., event control computing platform 110). In some instances, data feed aggregation server 180 may receive social media activity feed data from various social media platforms (e.g., social media service computing platform 160, social media service computing platform 170), merchant offer data from various merchant platforms (e.g., defining one or more merchant-specific offers that may be redeemable by customers at such merchants), and/or other activity data and/or content from other sources, and data feed aggregation server 180 may aggregate any and/or all of the received data to produce an aggregated data feed. Subsequently, data feed aggregation server 180 may communicate and/or otherwise provide the aggregated data feed to one or more destination systems, such as event control computing platform 110, so as to enable one or more functions provided by event control computing platform 110 (e.g., such as social-media-enabled financial-transaction functions). In some instances, the aggregated data feed may be communicated by data feed aggregation server 180 to event control computing platform 110 via a secure and/or encrypted communications link established between event control computing platform 110 and data feed aggregation server 180.

Each of the first user computing device 190 user and the second computing device 195 may be a desktop computer, laptop computer, workstation, or other computing device that is configured to be used by a user. In some arrangements, one user may be a parent/guardian and another user may be a teen or other minor supervised by the parent/guardian. For instance, the user of second computing device 195 may utilize the second computing device 195 to define one or more rules (e.g., spending limits, transaction approval conditions, or the like) for the user of first user computing device 190. In addition, as the user of second user computing device 195 utilizes the second user computing device 195 and/or one or more other systems and/or devices to request transactions, event control computing platform 110 and/or event validation computing platform 120 may selectively authorize such transactions based on rules received from the first user computing device 190 and/or defined by the user of the first user computing device 190 and/or based on other factors and/or rules.

Computing environment 100 also may include one or more networks, which may interconnect one or more of event control computing platform 110, event validation computing platform 120, administrative computing device 130, social media service computing platform 160, social media service computing platform 170, data feed aggregation server 180, first user computing device 190, and second user computing device 195. For example, computing environment 100 may include private network 140, which may be owned and/or operated by a specific organization and/or which may interconnect one or more systems and/or other devices associated with the specific organization. For example, event control computing platform 110, event validation computing platform 120, and administrative computing device 130 may be owned and/or operated by a specific organization, such as a financial institution, and private network 140 may interconnect event control computing platform 110, event validation computing platform 120, administrative computing device 130, and one or more other systems and/or devices associated with the organization. Additionally, private network 140 may connect (e.g., via one or more firewalls) to one or more external networks not associated with the organization, such as public network 150. Public network 150 may, for instance, include the internet and may connect various systems and/or devices not associated with the organization operating private network 140. For example, public network 150 may interconnect social media service computing platform 160, social media service computing platform 170, data feed aggregation server 180, user computing devices 190 and 195, and/or various other systems and/or devices.

In some arrangements, the computing devices that make up and/or are included in event control computing platform 110, event validation computing platform 120, administrative computing device 130, social media service computing platform 160, social media service computing platform 170, data feed aggregation server 180, and user computing devices 190 and 195 may be any type of computing device capable of receiving a user interface, receiving input via the user interface, and communicating the received input to one or more other computing devices. For example, the computing devices that make up and/or are included in event control computing platform 110, event validation computing platform 120, administrative computing device 130, social media service computing platform 160, social media service computing platform 170, data feed aggregation server 180, user computing devices 190 and 195 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of the computing devices that make up and/or are included in event control computing platform 110, event validation computing platform 120, administrative computing device 130, social media service computing platform 160, social media service computing platform 170, data feed aggregation server 180, user computing devices 190 and 195 may, in some instances, be special-purpose computing devices configured to perform specific functions.

Referring to FIG. 1B, event control computing platform 110 may include one or more processor(s) 111, memory(s) 112, and communication interface(s) 113. A data bus may interconnect processor(s) 111, memory(s) 112, and communication interface(s) 113. Communication interface(s) 113 may be one or more network interfaces configured to support communications between event control computing platform 110 and one or more networks (e.g., private network 140, public network 150). For example, event control computing platform 110 may establish one or more connections and/or communication links to one or more other systems and/or devices (e.g., event validation computing platform 120, administrative computing device 130, social media service computing platform 160, social media service computing platform 170, data feed aggregation server 180, and user computing devices 190 and 195) via communication interface(s) 113, and event control computing platform 110 may exchange data with the one or more other systems and/or devices (e.g., event validation computing platform 120, administrative computing device 130, social media service computing platform 160, social media service computing platform 170, data feed aggregation server 180, and user computing devices 190 and 195) via communication interface(s) 113 while the one or more connections and/or communication links are established. Memory(s) 112 may include one or more program modules having instructions that when executed by processor(s) 111 cause event control computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of event control computing platform 110 and/or by different computing devices that may form and/or otherwise make up event control computing platform 110.

For example, memory(s) 112b may have, store, and/or include an event control module 112a, an event control database 112b, a connection management module 112c, and a machine learning engine 112d. Event control module 112a may have, store, and/or include instructions that direct and/or cause event control computing platform 110 to orchestrate event validation operations and event control operations across multiple computer systems and devices in computing environment 100 and perform other associated functions, as discussed in greater detail below. Event control database 112b may store information used by event control computing platform 110 in orchestrating event validation operations and event control operations across multiple computer systems and devices in computing environment 100 and in performing other associated functions. Connection management module 112c may have, store, and/or include instructions that direct and/or cause event control computing platform 110 to establish one or more connections and/or communication links to one or more other systems and/or devices (e.g., event validation computing platform 120, administrative computing device 130, social media service computing platform 160, social media service computing platform 170, data feed aggregation server 180, supervisory user computing device 190, and subordinate user computing device 195) via communication interface(s) 113 and/or to manage and/or otherwise control the exchanging of data with the one or more other systems and/or devices (e.g., event validation computing platform 120, administrative computing device 130, social media service computing platform 160, social media service computing platform 170, data feed aggregation server 180, first user computing device 190, and second user computing device 195) via communication interface(s) 113 while the one or more connections and/or communication links are established. Machine learning engine 112d may have, store, and/or include instructions that direct and/or cause event control computing platform 110 to dynamically analyze data collected by event control computing platform 110 based on historical data sets and/or present operations and automatically optimize the functions provided by event control computing platform 110 based on analyzing such data.

First participant computing platform 196 and second participant computing platform 197 may be associated directly with merchants such as restaurants/food service providers, product manufacturers, wholesalers, or retailers, for example, or alternatively may be various other types of platforms offering goods and/or services (referred to herein collectively as "products"). In some example embodiments, when a user adds a product to his or her "wishlist," event control computing platform 110 may transmit a request and thereafter receive pricing and availability information from a plurality of sources, as illustrated in FIG. 1A as first participant computing platform 196 and second participant computing platform 197. The data feed aggregation server 180 may aggregate and sort pricing information received from the various sources.

In the context of users who are in a parental/guardian role to another user, the event control computing platform 110 or the computing device of the parent/guardian, e.g., second user computing device 195, may generate rules that the parent/guardian may establish or select from that are aimed at assisting the other user in making purchases and managing assets. The second user computing device 195 may be configured to provide read-only access to an account stored on the first user computing device 190 or, depending on the level of oversight desired, may allow some degree of control to make changes to the first user's account(s) and/or user interface. When the second user loans funds to the first user in order to complete a purchase, the event control computing platform 110 may configure the first and second user interfaces to include information with respect to amounts owed, payment schedules, interest, and other conditions of the loan. The first user may have the ability to transfer funds to the second user through the user interface (which may, e.g., be generated by event control computing platform 110 and/or displayed by first user computing device 190), for instance, as loan payments or for other purposes. The system may be used for a variety of purposes in which a parent/guardian may advance funds to a supervised user, such as automobile payments, insurance premiums, living expenses, tuition or other educational expenses, replenishing highway toll accounts, and so forth.

In other aspects, the event control computing platform 110 may utilize machine learning to improve functionality of the system. For example, the event control computing platform 110 may receive from user computing device(s) 190 and/or 195, information regarding purchasing habits or preferences of the respective user. For example, a user may have a habit of purchasing larger meals on certain days of the week that coincide with an exercise routine, or otherwise may have different food preferences for different days of the week. Machine learning also may be used to replace or supplement user-defined settings. For example, even if a user does not specify that he or she is a vegetarian in the user-defined settings, machine learning may identify this characteristic based on the user's purchases over time. Machine learning also may be used as a form of authentication. For example, a requested transaction may be considered more likely to be authentic if the user previously authorized similar transactions.

Machine learning also may be used to assign reliability ratings to users, such as the reliability of a user in completing transactions on behalf of other users. For example, if a second user is authorized to make a purchase on behalf of a first user but fails to deliver the purchased goods, delivers the wrong goods, or is unreasonably late in delivery, the first user may report such event, e.g., via an appropriate user interface on the first user computing device 190. Depending on the number and severity of any negative events and whether they are satisfactorily resolved, the event control computing platform 110 may impose restrictions on the offending user. In severe cases, the event control computing platform 110 may preclude the offending user from making subsequent transactions on the system, or from making subsequent transactions on behalf of the reporting user(s). In less severe cases, the event control computing platform 110 may cause a rating or warning to be displayed on other user computing devices whenever the offending user is requested to make a transaction, or issue a private warning to the offending user. The event control computing platform 110 likewise may receive positive feedback from user interfaces, for example when the user reliably completes transactions and especially when the user exceeds expectations in some way. The event control computing platform 110 may use any positive feedback received to offset negative feedback and/or to cause a favorable rating to be displayed on other user computing devices when the user is requested to complete a transaction on their behalf.

The event control computing platform 110 also may be used to assist users who are in a parent/guardian relationship with other users. For example, in the case where a parent/guardian may extend loans to the other user(s) to complete purchases, the event control computing platform 110 may receive information concerning the reliability of the other user(s) in repaying the loans. Users may receive a negative event upon missing a loan payment or making a late payment, and a positive event upon making timely payments or satisfying an obligation entirely. The event control computing platform 110 may aggregate this information to automatically adjust criteria used for extending credit from the parent/guardian to that user, or to cause a notification to be transmitted to the parent/guardian user device inquiring whether the parent/guardian wishes to modify the criteria used for extending credit to the other user.

Figure 2:
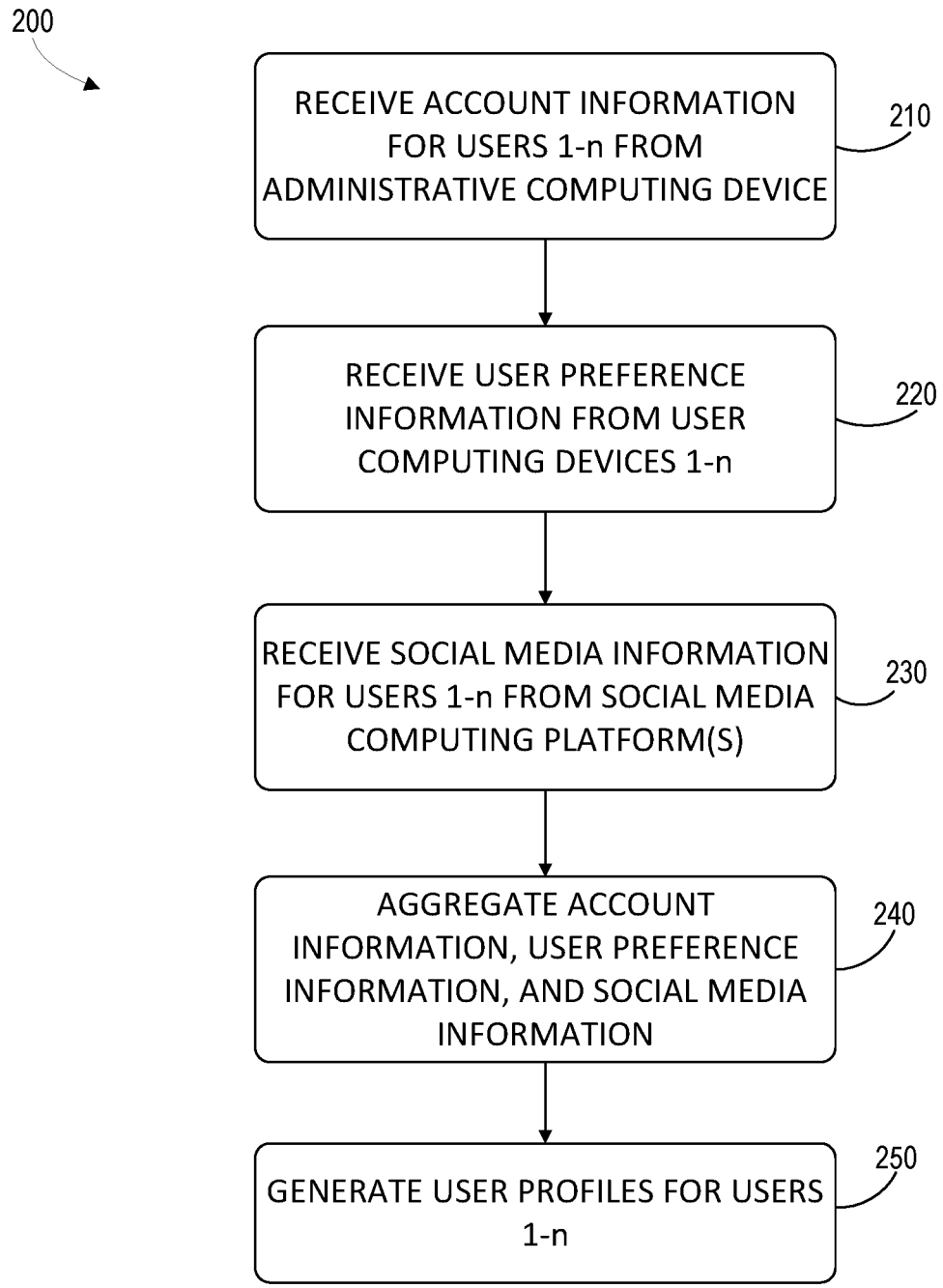
FIG. 2 depicts an illustrative event sequence for creating user profiles in accordance with one or more example embodiments.

FIG. 2 illustrates an example of an event sequence 200 for creating user profiles. At step 210, the event control computing platform 110 may receive account information from an administrative computing device 130. The account information may include one or more linked user accounts, which may be managed by a common financial institution or by two or more different financial institutions. At step 220, the event control computing platform 110 may receive user preference information from a plurality of user computing devices 190, 195. The user preference information may include general and/or specific information pertaining to purchases that may be executed on the user's behalf by a proxy user. General information may identify, for example, preferred food categories, dietary restrictions, and so forth. Specific information may identify, for example, particular menu items from establishments located in the vicinity of the user group. At step 230, the event control computing platform 110 may receive social media information from a social media computing platform 160 or 170. At step 240, the data feed aggregation server 180 may aggregate the account information, user preference information, and social media information, and at step 250, based on the aggregated data, generate respective profiles for the plurality of users. In some examples, users may have more than one profile, such as different profiles for personal and business uses, for local and travel uses, for different geographical areas, and so forth.

Figure 3:
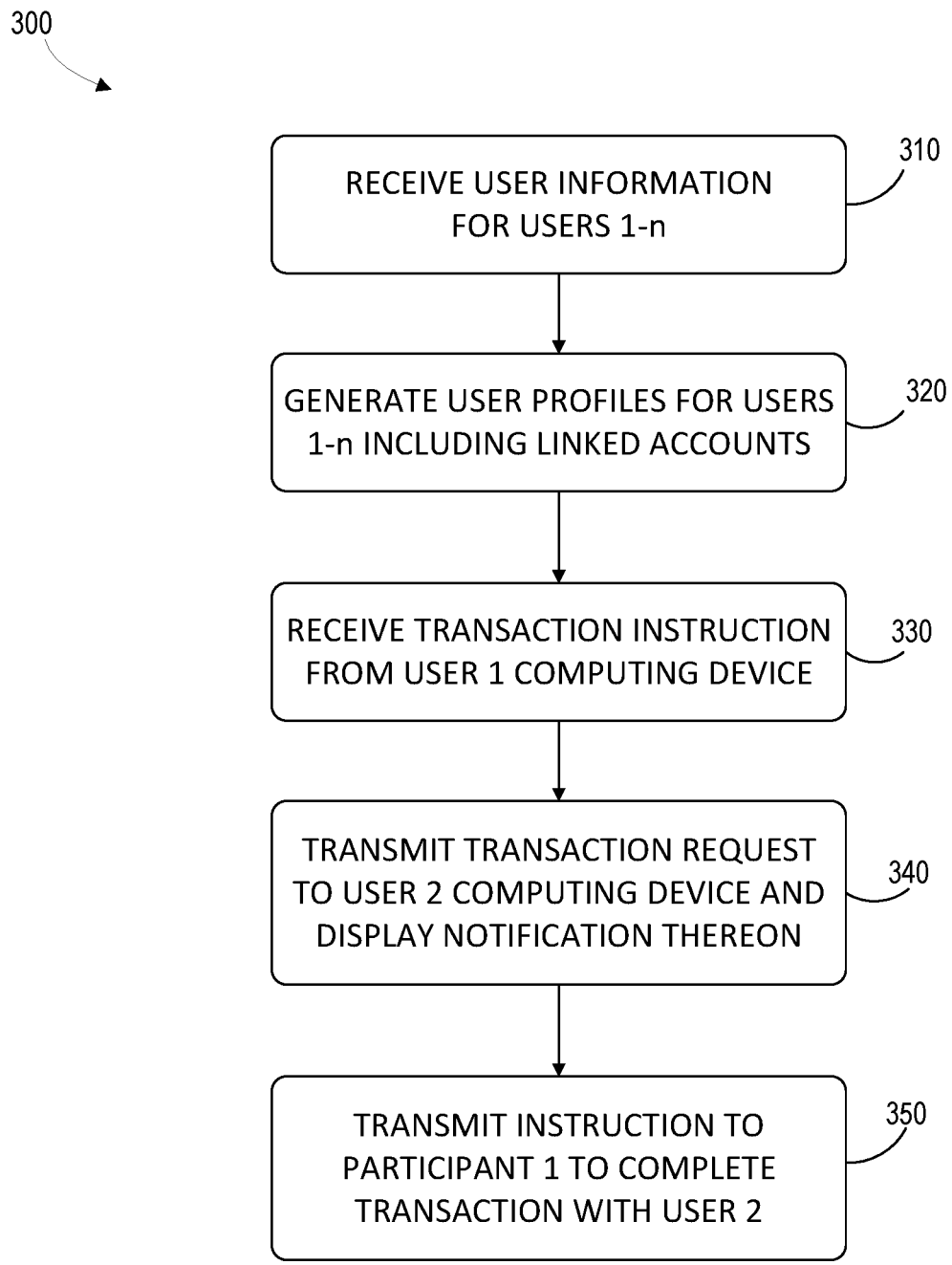
FIG. 3 depicts an illustrative event sequence for defining a segmented network and executing transactions by proxy in a computing environment in accordance with one or more example embodiments.

FIG. 3 illustrates an event sequence 300 in accordance with one or more example embodiments. At step 310, event control computing platform 110 receives user information for a plurality of users. In some examples, the plurality of users may be individuals within a segmented network sharing a defined relationship, such as individuals who are coworkers within a business or a subunit thereof, e.g., division, department, or workgroup, or individuals who are connections of each other on a social media platform. In other examples, the plurality of users may share a closer relationship, such as family members, friends, and/or neighbors. Just as a user may have more than one profile, a user may belong to more than one segmented network, e.g., work, family, friends, and so forth. At step 320, event control computing platform 110 may generate user profiles for the plurality of users. Additional details of examples of creating user profiles are described below in connection with FIG. 3. At step 330, event control computing platform 110 receives an instruction from first user computing device 190 for a transaction. At step 340, the request for the transaction may be transmitted to the second user computing device 195 which may cause a notification to be displayed thereon. At step 350, event control computing platform 110 transmits an instruction to first 196 or second 197 participant computing platform, authorizing the transaction to be completed. Together with this authorization, the event control computing platform 110 may update the linked user account(s) of the individual(s) on whose behalf purchases were made.

The instruction for a transaction received from first user computing device 190, in some cases, may result from action initiated by another individual. For example, in the office environment, one worker (e.g., second user) who is preparing to purchase food items at a nearby venue may transmit an inquiry to his or her colleagues, asking whether they would like to have items purchased from the venue. The user computing device(s) of any coworkers who indicate that they would like to have items purchased may transmit an instruction for a transaction, which is then processed by event validation computing platform 120; and a corresponding instruction may then be transmitted to second user computing device 195. In some cases, a first user may preauthorize any transactions requested by a second user, e.g., when the first user has sufficient trust and familiarity with the second user to allow the second user to make decisions on his or her behalf. When such preauthorization is given, event validation computing platform 120 may transmit an instruction authorizing the transaction without further input from the first user. For purposes of this disclosure, such a preauthorization is considered an instruction for a transaction received from first user computing device 190. Upon the second user completing the transaction on behalf of himself or herself and several coworkers, for example, the event control computing platform 110 may post the respective itemized charges to the linked user account(s) of the second user and the other users for whom purchases were made.

In some examples, the participant computing platform 196 or 197 may include online ordering functionality. The event control computing platform 110 may transmit an instruction 250 to the participant computing platform 196 or 197 that includes an itemized order for a plurality of users and their respective linked user accounts; and for convenience also may include an indication that the combined order will be picked up by the proxy user. The event control computing platform 110 may cause the itemized purchases to be charged to the respective user accounts. This way, each user may affect payment directly to the participant for his or her items, thus avoiding the need to provide advance payment or later reimbursement to the proxy user.

Administrative computing device 130 may transmit to the event control computing platform 110 business rules or other information that may assist users in identifying opportunities for proxy purchases, such as partnering businesses. Social media service computing platform(s) 160 and/or 170 also may transmit to the event control computing platform 110 additional information that may assist users, such as by identifying trends, opportunities for savings, and/or new businesses that may be offering food items or other products of possible interest to the user network. The data feed aggregation server 180 and/or machine learning engine 112$d$ may aggregate the various incoming information, and a machine learning dataset optionally may be used to refine the criteria used for aggregating the incoming information.

Figure 4A:
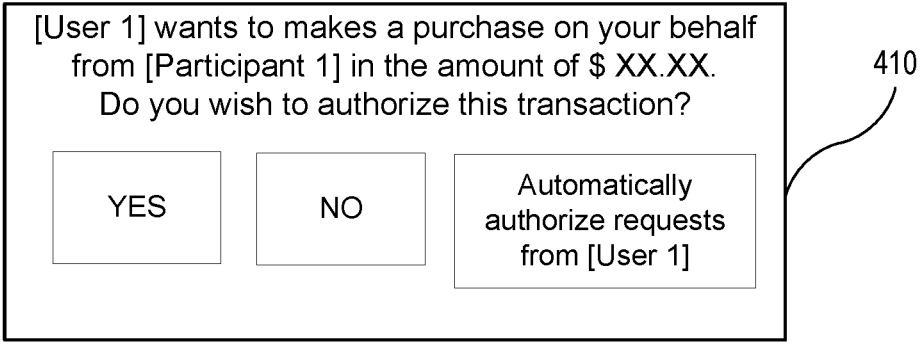
FIGS. 4A-4C depict example graphical user interfaces for authorizing user devices in accordance with one or more example embodiments.
Figure 4B:
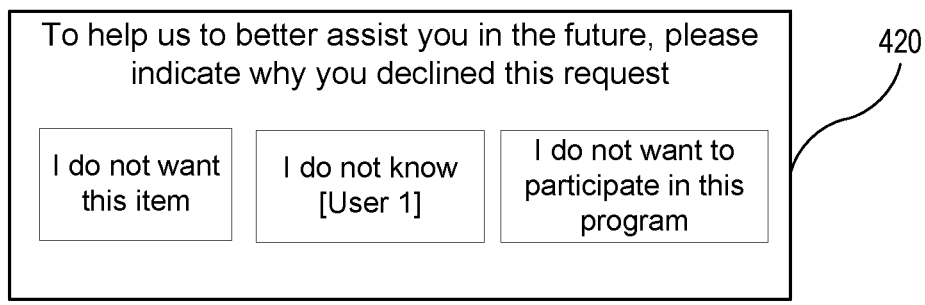
Figure 4C:
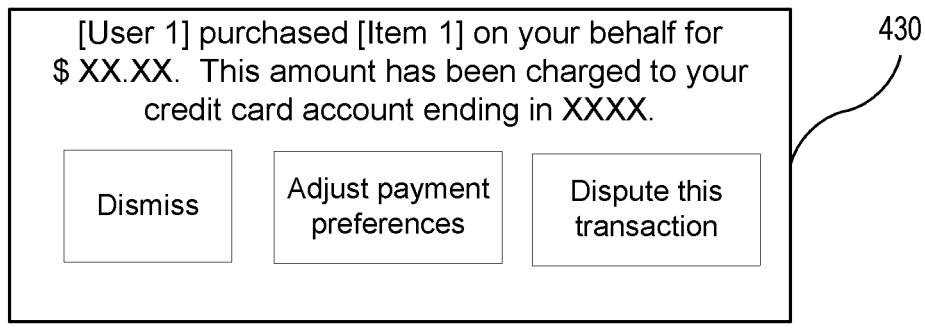

FIG. 4A-4C illustrate examples of graphical user interfaces for the user device of a user (e.g., second user) on whose behalf a proxy user (e.g., first user) makes a purchase. FIG. 4A shows a user interface 410 that may alert the second user that the first user wants to make a purchase on behalf of the second user. The user interface may include such information as the item(s) to be purchased, the participant, and/or the amount of the purchase. If the second user selects "yes," event validation computing platform 120 may transmit an instruction to event control computing platform 110 authorizing the transaction. The user interface may include an option to automatically authorize all requests from a particular user, as shown in FIG. 4A. If the second user selects this auto-authorization option, event validation computing platform 120 may transmit an instruction to event control computing platform 110 authorizing the transaction; and any subsequent requests from the same first user may be authorized without sending another inquiry to the second user. If the second user selects "no," event control computing platform 110 may cause a further inquiry 420 to be displayed asking, for example, whether the second user does not want the particular item or whether there are other factors that may require adjustment of system settings, e.g., the second user does not know the requesting user or does not wish to participate in the proxy purchasing program. If the second user indicates that he or she does not know the requesting user, event control computing platform 110 may identify the request as potentially fraudulent and transmit a report to an administrator for possible investigation. Users who indicate that they are not interested in participating in the program may be opted out at that point or, for example, directed to an appropriate user interface for adjusting user settings.

FIG. 4C illustrates an example of a user interface 430 that contains confirmation that a purchase was completed on behalf of the second user. The interface 430 may identify such information as the proxy user, the product(s) purchased, the merchant, the sale price, and/or the payment method that was used. In the case where a parent/guardian loans funds to complete a transaction, the interface 430 may also indicate the amount that was borrowed to complete the purchase and/or other information concerning loan balances, repayment terms, and so forth. As shown, the interface 430 may provide options to dismiss the notification, adjust payment preferences, or dispute the transaction. Depending on the user's response, event control computing platform 110 may cause additional user interface(s) to be displayed to assist the user in the manner requested.

Figure 5A:
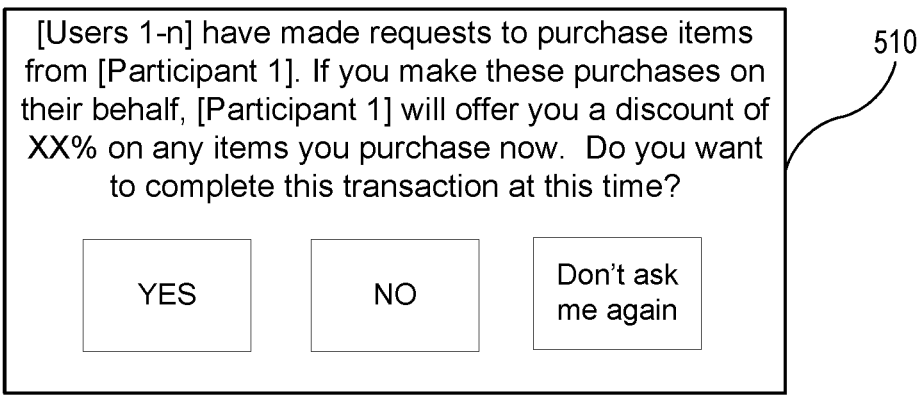
FIGS. 5A-5C depict example graphical user interfaces for proxy user devices in accordance with one or more example embodiments.
Figure 5B:
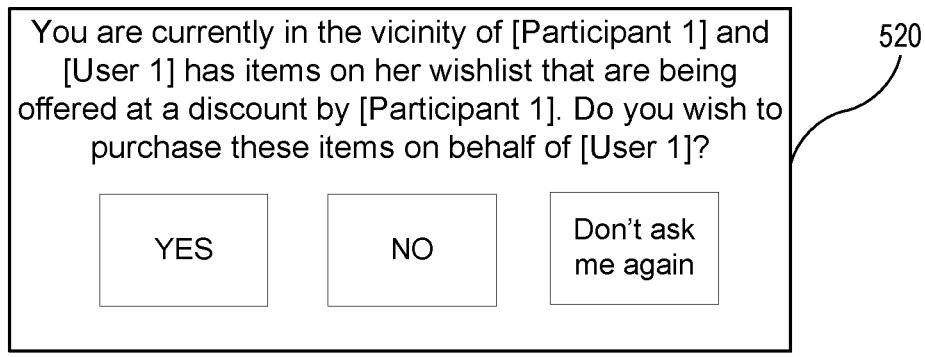
Figure 5C:
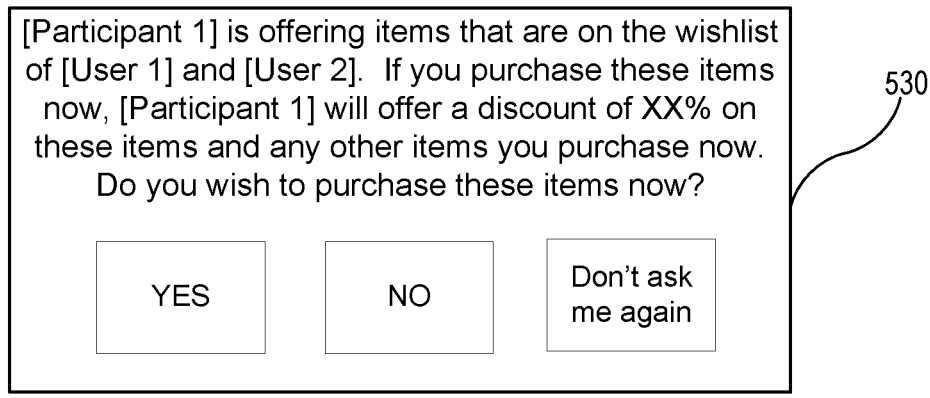

FIG. 5A-5C illustrate examples of graphical user interfaces for the user device of a user (first user) who may be requested to make purchases on behalf of other user(s) within a network. FIG. 5A shows a user interface 510 that informs a first user that other user(s) wish to make purchase(s) from a participating merchant, and that the merchant will offer the first user a discount on items purchased as an incentive for completing the transaction. The interface 510 may provide an option to accept the request, whereupon event validation computing platform 120 may transmit authorization and payment account information similar to the manner previously described. The interface 510 may then display a confirmation of the transaction and/or instructions for pick up or delivery of the purchased items. The interface 510 may also include options for declining the request, and for opting out of requests from the requesting party or opting out of the proxy purchasing program entirely.

FIG. 5B shows an example of a user interface 520 that utilizes geolocation functionality. Upon event control computing platform 110 determining that the first user is in the vicinity of a participating merchant from whom user(s) within the network have placed item(s) on a wishlist, and optionally other criteria being satisfied such as the item(s) being offered at a discount, the interface 520 presents an inquiry asking the user whether he or she wishes to purchase the items. The interface 520 may include other information, such as any incentive offered by the merchant to the first user for completing the transaction.

FIG. 5C illustrates an example of a user interface 530 that alerts a user that item(s) on the wishlist(s) of other user(s), which in some examples may be wishes for gifts, are being offered by a participating merchant at a discount. The user interface 530 may include an incentive for the first user to complete the transaction, such as a discount on any additional purchases made at the same time. User interfaces 520 and 530 may include similar response options as described above in connection with FIG. 5A to accept or decline the request and/or to modify settings for receiving system notifications.

The particular user interfaces shown in FIGS. 4 and 5 are merely illustrative and may be customized depending on user preferences as well as the type of device(s) being used. For example, user interfaces on a smartphone or other telephone-enabled device may include an option to call another entity associated with the computing platform, e.g., other user(s) and/or participant(s). User interfaces may include other desired functionality, such as an option to send a message to other user(s) or participant(s).

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
      receive, via the communication interface, user information for a plurality of users and generate a corresponding plurality of user profiles, each user profile including one or more linked user accounts;
      establish, via the communication interface, a first connection with a first user computing device associated with a first user and, while the first connection is established, receive from the first user computing device an instruction for a transaction;
      process the transaction instruction in an event validation computing platform and, upon validating the transaction instruction, establish, via the communication interface, a second connection with a second user computing device associated with a validated second user, the second user being in a predefined relationship with the first user and, while the second connection is established, transmit to the second user computing device a request to complete the transaction on behalf of the first user, wherein the request, when executed by the second user computing device, causes a notification to be displayed on the second user computing device;
      establish, via the communication interface, a third connection with a first participant computing platform and, while the third connection is established, transmit to the first participant computing platform an instruction to complete the transaction with the second user on behalf of the first user; and
      establish, via the communication interface, a fifth connection with an event control computing platform and, while the fifth connection is established, assign to the second user a reliability rating in completing transactions on behalf of other users, wherein the event validation computing platform weighs any positive and negative feedback for the second user from the transactions on behalf of the other users as criteria for validating the transaction instruction, wherein the second user is precluded from completing the transaction on behalf of the first user based on unresolved negative feedback, and wherein the notification to be displayed on the second user computing device includes information relating to the reliability rating.

2. The computing platform of claim 1, wherein the memory stores additional computer-readable instructions that, when executed by the at least one processor, cause the computing platform to:
   establish, via the communication interface, a fourth connection with a plurality of user computing devices and, while the fourth connection is established, receive user preference information from the plurality of user computing devices, wherein the user preference information is used to generate the corresponding plurality of user profiles.

3. The computing platform of claim 1, wherein the memory stores additional computer-readable instructions that, when executed by the at least one processor, cause the computing platform to:
   establish, via the communication interface, a fourth connection with an administrative computing device and, while the fourth connection is established, receive from the administrative computing device linked user account information for the plurality of users, wherein the linked user account information is used to generate the plurality of user profiles.

4. The computing platform of claim 1, wherein the memory stores additional computer-readable instructions that, when executed by the at least one processor, cause the computing platform to:
   establish, via the communication interface, a fourth connection with a social media computing platform and, while the fourth connection is established, receive from the social media computing platform social media information for the plurality of users, wherein the social media information is used to generate the plurality of user profiles.

5. The computing platform of claim 1, wherein the memory stores additional computer-readable instructions that, when executed by the at least one processor, cause the computing platform to:
   receive, via the communication interface, geolocation information for the second user computing device, wherein the request to complete the transaction on behalf of the first user is generated based on a geolocation of the second user computing device.

6. The computing platform of claim 1, wherein the memory stores additional computer-readable instructions that, when executed by the at least one processor, cause the computing platform to:
   transmit, via the communication interface, to the first user computing device, a request to authorize the transaction which, when executed by the first user computing device, causes a notification to be displayed on the first user computing device; and
wherein the instruction to complete the transaction is transmitted to the first participant computing platform upon receiving an authorization from the first user computing device.

7. The computing platform of claim 1, wherein the memory stores additional computer-readable instructions that, when executed by the at least one processor, cause the computing platform to:
establish, via the communication interface, a fourth connection with a machine learning engine and, based on a machine learning dataset, modify one or more of the plurality of user profiles.

8. The computing platform of claim 1, wherein the memory stores additional computer-readable instructions that, when executed by the at least one processor, cause the computing platform to:
while the third connection is established, receive, via the communication interface, from the first participant computing platform, itemized information allocating items within the transaction to a plurality of users; and update the linked user accounts of the respective plurality of users.

9. A method, comprising:
at a computing platform comprising at least one processor, memory, and a communication interface:
receiving, via the communication interface, user information for a plurality of users and generating a corresponding plurality of user profiles, each user profile including one or more linked user accounts;
establishing, via the communication interface, a first connection with a first user computing device associated with a first user and, while the first connection is established, receiving from the first user computing device an instruction for a transaction;
processing the transaction instruction in an event validation computing platform and, upon validating the transaction instruction, establishing, via the communication interface, a second connection with a second user computing device associated with a validated second user, the second user being in a predefined relationship with the first user and, while the second connection is established, transmitting to the second user computing device a request to complete the transaction on behalf of the first user, wherein the request, when executed by the second user computing device, causes a notification to be displayed on the second user computing device;
establishing, via the communication interface, a third connection with a first participant computing platform and, while the third connection is established, transmitting to the first participant computing platform an instruction to complete the transaction with the second user on behalf of the first user; and
establishing, via the communication interface, a fifth connection with an event control computing platform and, while the fifth connection is established, assigning to the second user a reliability rating in completing transactions on behalf of other users, wherein the event validation computing platform weighs any positive and negative feedback for the second user from the transactions on behalf of the other users as criteria for validating the transaction instruction, wherein the second user is precluded from completing the transaction on behalf of the first user based on unresolved negative feedback, and wherein the notification to be displayed on the second user computing device includes information relating to the reliability rating.

10. The method of claim 9, further comprising:
establishing, via the communication interface, a fourth connection with a plurality of user computing devices and, while the fourth connection is established, receiving user preference information from the plurality of user computing devices, wherein the user preference information is used to generate the corresponding plurality of user profiles.

11. The method of claim 9, further comprising:
establishing, via the communication interface, a fourth connection with an administrative computing device and, while the fourth connection is established, receiving from the administrative computing device linked user account information for the plurality of users, wherein the linked user account information is used to generate the plurality of user profiles.

12. The method of claim 9, further comprising:
establishing, via the communication interface, a fourth connection with a social media computing platform and, while the fourth connection is established, receiving from the social media computing platform social media information for the plurality of users, wherein the social media information is used to generate the plurality of user profiles.

13. The method of claim 9, further comprising:
receiving, via the communication interface, geolocation information for the second user computing device, wherein the request to complete the transaction on behalf of the first user is generated based on a geolocation of the second user computing device.

14. The method of claim 9, further comprising:
transmitting, via the communication interface, to the first user computing device, a request to authorize the transaction which, when executed by the first user computing device, causes a notification to be displayed on the first user computing device; and
wherein the instruction to complete the transaction is transmitted to the first participant computing platform upon receiving an authorization from the first user computing device.

15. The method of claim 9, further comprising:
establishing, via the communication interface, a fourth connection with a machine learning engine and, based on a machine learning dataset, modifying one or more of the plurality of user profiles.

16. The method of claim 9, further comprising:
while the third connection is established, receiving, via the communication interface, from the first participant computing platform, itemized information allocating items within the transaction to a plurality of users; and updating the linked user accounts of the respective plurality of users.

17. One or more non-transitory computer-readable media storing instructions that, when executed by a computing platform comprising at least one processor, memory, and a communication interface, cause the computing platform to:
receive, via the communication interface, user information for a plurality of users and generate a corresponding plurality of user profiles, each user profile including one or more linked user accounts;
establish, via the communication interface, a first connection with a first user computing device associated with a first user and, while the first connection is established, receive from the first user computing device an instruction for a transaction;

process the transaction instruction in an event validation computing platform and, upon validating the transaction instruction, establish, via the communication interface, a second connection with a second user computing device associated with a validated second user, the second user being in a predefined relationship with the first user and, while the second connection is established, transmit to the second user computing device a request to complete the transaction on behalf of the first user, wherein the request, when executed by the second user computing device, causes a notification to be displayed on the second user computing device;

establish, via the communication interface, a third connection with a first participant computing platform and, while the third connection is established, transmit to the first participant computing platform an instruction to complete the transaction with the second user on behalf of the first user; and establish, via the communication interface, a fifth connection with an event control computing platform and, while the fifth connection is established, assign to the second user a reliability rating in completing transactions on behalf of other users, wherein the event validation computing platform weighs any positive and negative feedback for the second user from the transactions on behalf of the other users as criteria for validating the transaction instruction, wherein the second user is precluded from completing the transaction on behalf of the first user based on unresolved negative feedback, and wherein the notification to be displayed on the second user computing device includes information relating to the reliability rating.

18. The non-transitory computer-readable media of claim 17 which stores additional instructions that, when executed by the computing platform, cause the computing platform to:

establish, via the communication interface, a fourth connection with a plurality of user computing devices and, while the fourth connection is established, receive user preference information from the plurality of user computing devices, wherein the user preference information is used to generate the corresponding plurality of user profiles.

19. The non-transitory computer-readable media of claim 17 which stores additional instructions that, when executed by the computing platform, cause the computing platform to:

establish, via the communication interface, a fourth connection with an administrative computing device and, while the fourth connection is established, receive from the administrative computing device linked user account information for the plurality of users, wherein the linked user account information is used to generate the plurality of user profiles.

20. The non-transitory computer-readable media of claim 17 which stores additional instructions that, when executed by the computing platform, cause the computing platform to:

establish, via the communication interface, a fourth connection with a social media computing platform and, while the fourth connection is established, receive from the social media computing platform social media information for the plurality of users, wherein the social media information is used to generate the plurality of user profiles.

* * * * *